United States Patent [19]

Bernier et al.

[11] 3,925,529
[45] Dec. 9, 1975

[54] METHOD FOR MAKING SHOES WITH CLEATED BOTTOMS

[75] Inventors: Louis E. Bernier, Rockland; James P. Giblin, Milton, both of Mass.

[73] Assignee: E. T. Wright & Co., Inc., Rockland, Mass.

[22] Filed: Oct. 2, 1970

[21] Appl. No.: 77,672

Related U.S. Application Data

[62] Division of Ser. No. 831,373, June 9, 1969, Pat. No. 3,587,181.

[52] U.S. Cl. ............ 264/244; 36/2.5 AH; 264/275; 264/277
[51] Int. Cl.² .......................................... B29H 7/08
[58] Field of Search ............... 264/244, 275, 277; 36/2.5 AG, 2.5 AH, 59, 67

[56] References Cited
UNITED STATES PATENTS

| | | | |
|---|---|---|---|
| 1,749,351 | 3/1930 | McQueen | 36/59 |
| 2,135,570 | 11/1938 | Ellis | 264/276 UX |
| 3,081,497 | 3/1963 | Scherry | 264/276 UX |
| 3,170,251 | 2/1965 | Patrick | 36/59 R |
| 3,187,073 | 6/1965 | Bingham, Jr. | 264/277 X |
| 3,324,219 | 6/1967 | Porter et al. | 264/244 |
| 3,328,901 | 7/1967 | Strickland | 36/59 |
| 3,343,285 | 9/1967 | Kowal | 36/67 D |
| 3,395,209 | 7/1968 | Millard | 264/277 X |
| 3,452,378 | 7/1969 | Ferreira | 264/244 UX |
| 3,522,669 | 8/1970 | Simons | 36/67 A |
| 3,523,607 | 8/1970 | Gillemot et al. | 264/275 UX |
| 3,551,957 | 1/1971 | Ramm | 264/244 |
| 3,597,863 | 8/1971 | Austin et al. | 36/59 R |

*Primary Examiner*—Robert F. White
*Assistant Examiner*—T. E. Balhoff
*Attorney, Agent, or Firm*—Robert T. Gammons

[57] ABSTRACT

A mold assembly for incorporating a cleat plate in the bottom of a shoe by molding of an outsole of elastomer to the bottom of a lasted upper about a cleat plate to which there are fixed a plurality of cleats comprising an open top mold assembly embodying a sole plate containing holes for receiving the cleats of the cleat plate and holding the latter intermediate the bottom of the mold and the bottom of the lasted upper supported on the mold with predetermined portions of the cleats within the mold cavity and the remainder within the holes in the sole plate, and a method for making such cleated shoe bottoms.

8 Claims, 23 Drawing Figures

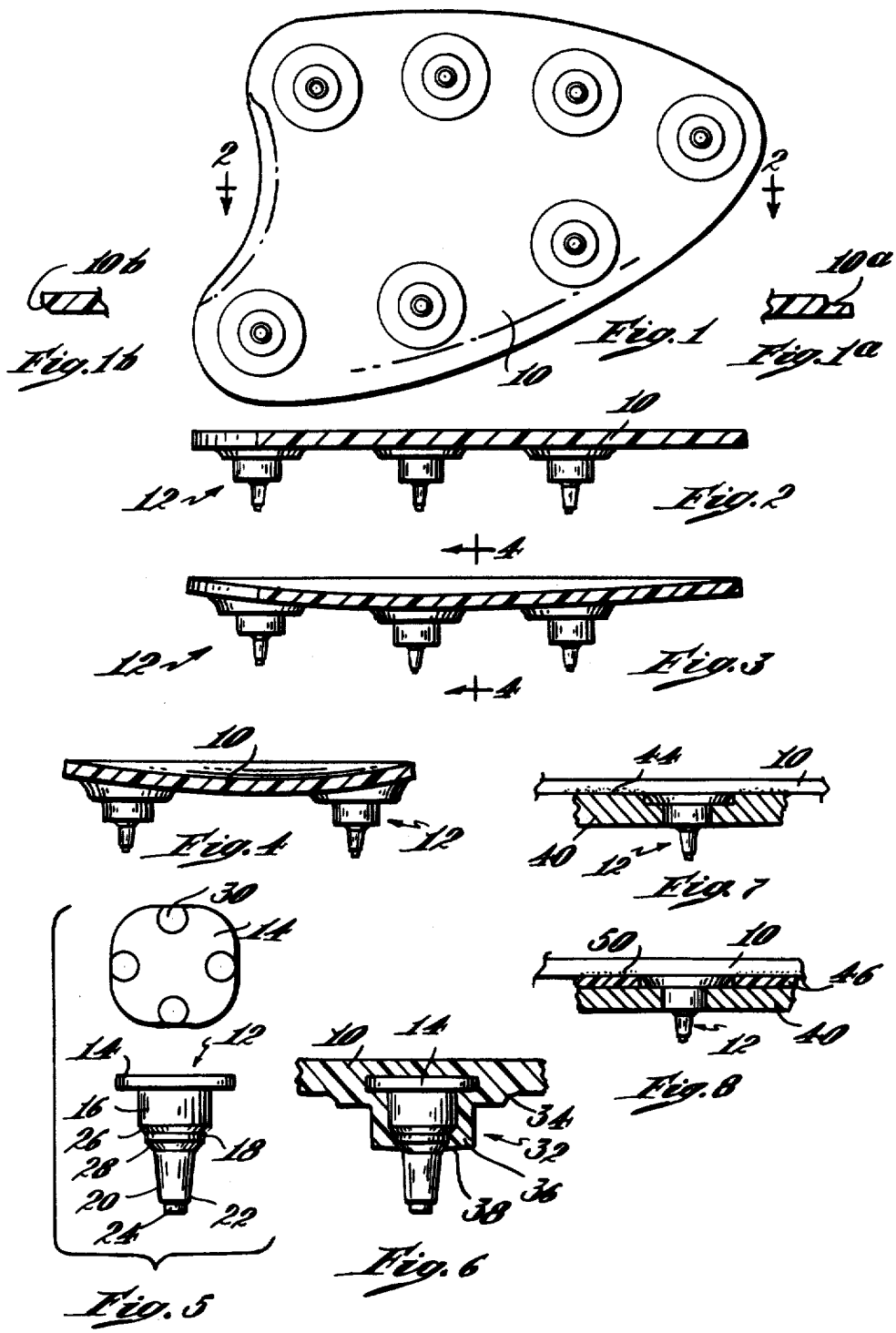

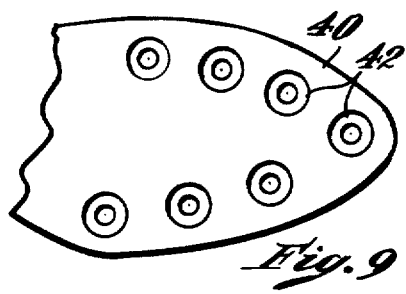
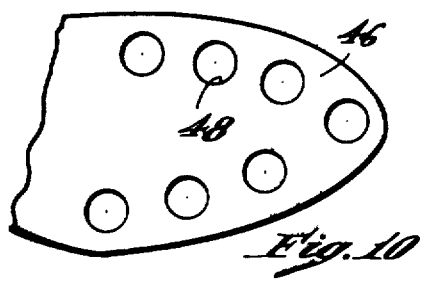
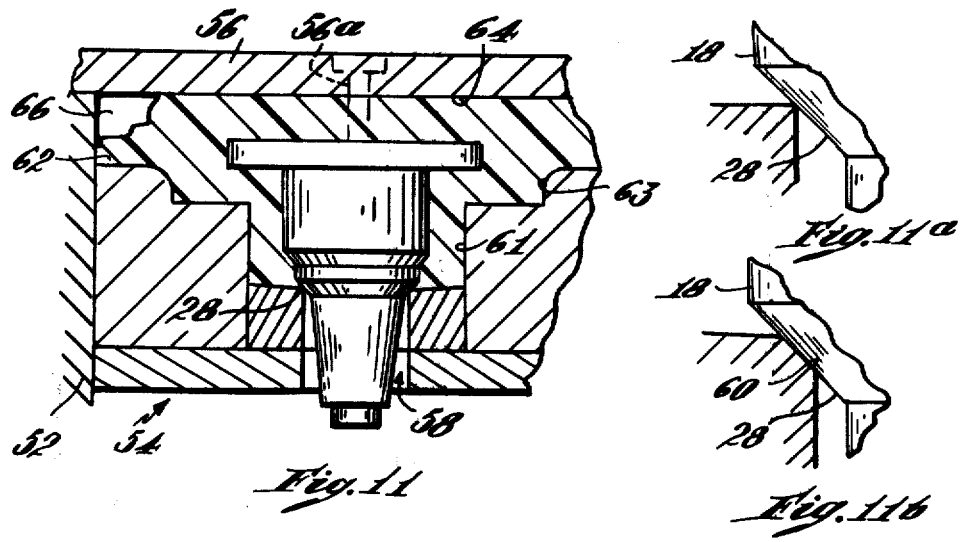
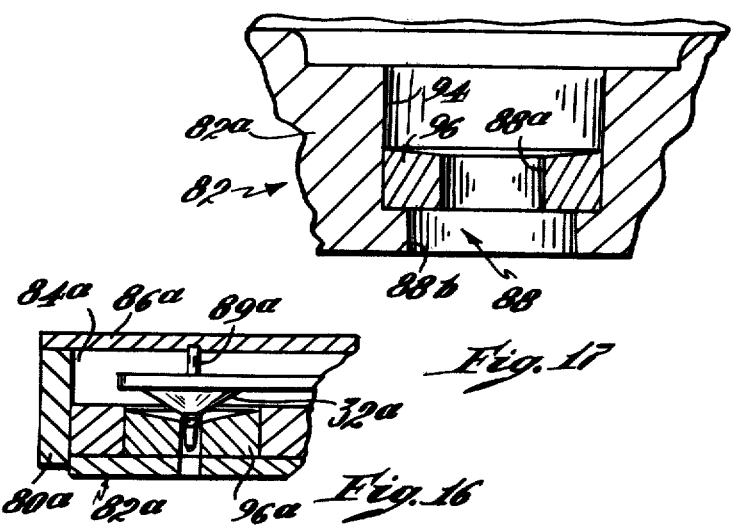

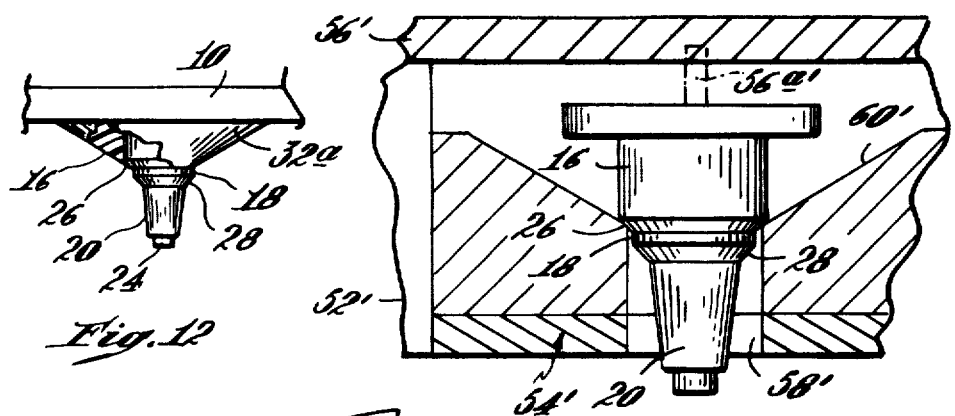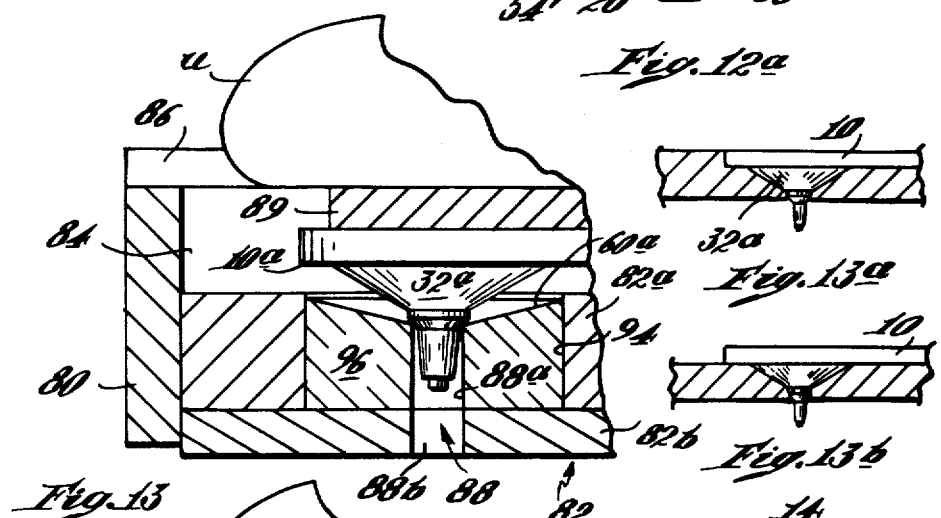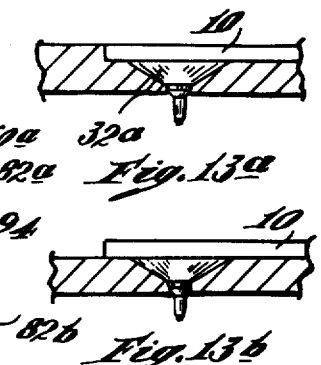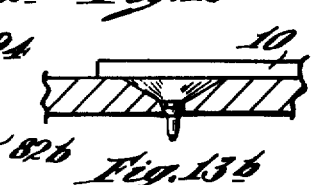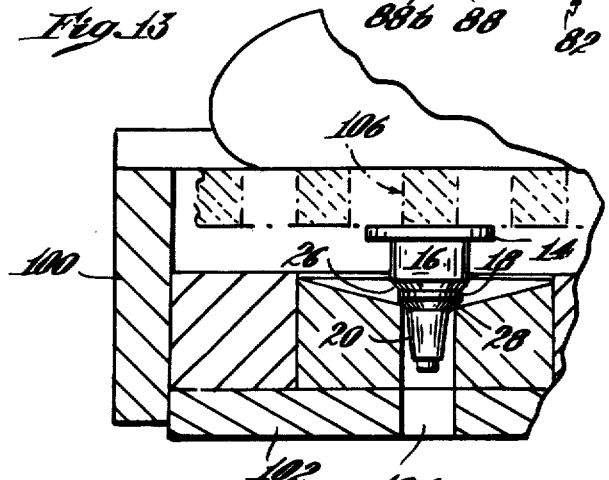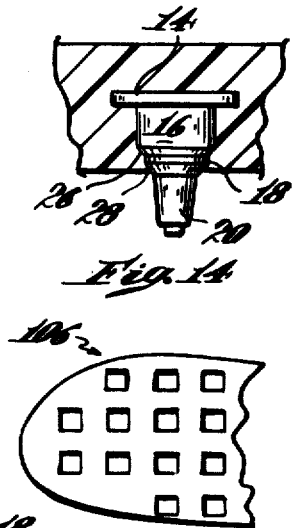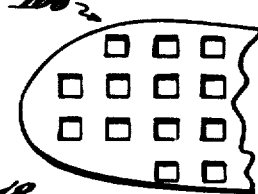

METHOD FOR MAKING SHOES WITH CLEATED BOTTOMS

This is a division of our copending U.S. Pat. application Ser. No. 831,373, filed June 9, 1969, now U.S. Pat. No. 3,587,181 owned by E. T. Wright and Co. Inc.

BACKGROUND OF THE INVENTION

Cleat plate and cleats adapted to be incorporated in our U.S. Pat. Nos. 3,486,249, 3,492,744, 3,529,370, 3,537,193 and 3,480,979 also owned by E. T. Wright & Co., Inc. This invention has for its objects to provide an improved cleat plate with cleats attached thereto, an improved method of incorporating the cleat plate and cleats into a shoe bottom and a novel mold assembly for effecting incorporation of the cleat plate and cleats in an elastomeric bottom by molding.

SUMMARY

As herein illustrated, the cleat plate corresponds substantially in configuration to the part of the bottom in which it is ito be incorporated having at one side a plurality of integrally formed bosses. A cleat is molded into each of the bosses. Each cleat has a flat head and a shank at right angles thereto, the shank having a first cylindrical portion next to the head of relatively large diameter, a second cylindrical portion of smaller diameter and a tapered portion terminating in a tip. There is a first conical shoulder at the junction of the first and second cylindrical portions and a second conical shoulder at the junction of the second cylindrical portion and the tapered portion. The cleats are molded into the cleat plate and into the bosses with the head in the cleat plate and with the first cylindrical portions, first conical shoulders, second cylindrical portions and the upper ends of the second conical shoulders buried in the bosses. In one form the bosses are of two diameters comprising a cylindrical portion of relatively large diameter next to the cleat plate and a cylindrical portion of smaller diameter extending from the cylindrical portion of larger diameter. In another form the bosses are conical.

The plate may be perfectly flat or may be curved both longitudinally and transversely to conform to the bottom of a lasted upper which is slightly convex; is preferably comprised of an elastomer but may be comprised of any of the man-made materials which will afford flexibility, resistance to cracking, lightness in weight and sufficient tear-resistance to hold the cleats attached thereto.

In accordance with the invention the cleat plate and cleats may be attached to the inner surface of a preformed outsole of leather or man-made material with the cleats extending through holes in the outsole and from the tread surface. An adhesive is employed to unite the plate to the outsole. Optionally, a midsole or cushion layer may be interposed between the cleat plate and the outsole with its opposite surface adhesively united to the cleat plate and outsole respectively,--the midsole or cushion layer in this case being provided with holes through which the cleats extend. The cleat plate may also be incorporated in a molded bottom by compression or injection molding,---this being accomplished by supporting the cleat plate in the mold cavity of an open top mold and introducing an elastomer into the cavity. Natural and synthetic rubber and rubber compounds may be employed and when used the rubber is caused to conform to the configuration of the cavity and to the cleat plate and the portions of the cleats in the cavity by heat and pressure. Manmade plastics may also be used such as PVC and these are introduced by injecting the plasticized material into the cavity to cause it to fill the mold about the cleat plate and cleats.

The cleat plates with the bosses of two diameters are especially designed for use with preformed outsoles and the mold assembly for making cleat plates of this kind comprises a side ring and cleat plate mold, the latter containing a plurality of holes corresponding in number to the number of cleats. In one form the edge at the upper end of each hole in vertical section is a right angle and the diameter of the hole is less than the larger diameter of the second conical shoulder on the shank so as to support the cleat in the mold cavity with the larger diameter of the second conical shoulder slightly above the upper end of the hole. Optionally, the upper end of each hole may have a conical or beveled depression for receiving the second conical shoulder of the cleat. For the same reasons, the larger diameter of the beveled depression is made slightly smaller than the corresponding larger diameter of the second shoulder of the cleat so as to support the cleats in the mold cavity with the larger diameter of the second shoulder situated slightly above the upper end of the hole. The foregoing is to insure flow of the bottomforming composition around the corner onto the surface of the second conical shoulder to form a seal about the portion of the cleat extending from the boss. Above the upper ends of the holes there are first cylindrical holes of larger diameter having shallow conical bottoms and beyond that second cylindrical holes of still larger diameter having substantially flat bottoms. The cylindrical portions are adapted to accommodate the cylindrical portions of the cleats and to form the bosses at the lower side of the cleat plate within which the heads and cylindrical portions of the cleats are embedded.

The cleat plates with the conical bosses are especially designed for incorporation into the bottom of the shoe by molding and the mold assembly for making cleat plates of this kind differ from that for making the cleat plates with bosses of two diameters in that the cleat plate mold contains holes, the upper ends of which are of larger diameter so as to seat the first conical shoulders of the cleats, with the first cylindrical portions of the cleats above the upper ends of the holes in the mold cavity and with the second cylindrical portions, second conical shoulders and the tapered portions within the holes. The edges at the upper ends of the holes may be of right section or beveled and above the upper ends of the holes there are conical holes corresponding in configuration to the conical bosses to be formed.

The mold assembly for incorporating the cleat plates with the conical bosses in the bottom of the shoe comprises a side ring and sole plate mold, the latter containing a plurality of holes corresponding in number to the number of cleats. The edge of each hole at its upper end in vertical section is substantially a right angle and the diameter of each hole is less than the larger diameter of the second conical shoulder of the cleat so as to support the cleat plate in the mold with the second conical shoulder seated in the upper ends of the holes and only the tapered portions extending into the holes. The edges at the upper ends of the holes may be beveled rather than of right section. When beveled the larger diameters of the beveled portions of the holes are made slightly smaller than the larger diameters of the second conical shoulders of the cleats so that the upper portions of the second conical shoulders are situated above the upper ends of the holes and when the bottomforming composition is formed about them, it will form a seal where the shoulders extend from the tread surface. A shallow conical depression may be provided at the upper end of each hole whether the upper edge is of right section or beveled section, which has a polished surface which will form on the tread surface of the bottom a smooth conical elevation.

It is within the scope of the invention to incorporate and form a bottom member which comprises not only a cleat plate but also an outsole adapted to be attached to a lasted upper to provide a cleated shoe by forming the heads, first and second cylindrical portions, first conical shoulder and the upper portion of the second conical shoulder in a bottom member of such dimensions as to constitute an outsole by employing an elastomer which is sufficiently stiff and elastic to resist tearing of the cleats therefrom or tilting of the cleats therein and at the same time flexible enough to insure foot comfort.

The mold assembly for making such a bottom unit with cleats is provided with a sole plate mold containing holes, the upper ends of which are of a diameter to seat the second cylindrical portions of the cleats and as related above with the larger diameter of the second beveled shoulder situated slightly above their upper ends. The edges of the holes at the upper ends may be of right section or beveled. To enable holding the cleats in the holes during formation of the bottom-forming composition above them, the sole plate mold may be provided with magnetic inserts around each hole to fix the cleats in place. Alternatively, if the bottom is to be fixed directly to the bottom of the lasted upper a spacer may be placed between the upper ends of the cleat heads and the bottom of the lasted upper to support the heads of the cleats. The spacer may be a grid or latice so that the bottom-forming composition is free to flow through it into engagement with the bottom of the lasted upper thereby to provide adequate bond thereto. If the bottom is to be a unit sole a cover plate is employed to close the open top of the mold cavity and in this case the cover plate may be provided with rigid or yieldable spacer pins projecting downwardly from its underside for contact with the heads of the cleats to hold them firmly in place. Such pins will be made slender enough so as to be easy to extract from the formed bottom member.

The invention will now be described in greater detail with reference to the accompanying drawings wherein:

FIG. 1 is a plan view of a cleat plate corresponding in configuration to the forepart of the bottom of a shoe but of smaller area to which a plurality of cleats are attached;

FIG. 1a is a fragmentary section of a cleat plate such as shown in FIG. 1 with a marginal groove at its upper side;

FIG. 1b is a fragmentary section of a cleat plate such as shown in FIG. 1 with a bevel at its butt end;

FIG. 2 is a section taken on the line 2—2 of FIG. 1;

FIG. 3 is a section of a cleat plate and cleats such as shown in FIGS. 1 and 2 which has been shaped to make it longitudinally concave;

FIG. 4 is a transverse section of FIG. 3 showing the transverse curvature thereof;

FIG. 5 is an elevation and top view of a cleat;

FIG. 6 is a fragmentary section of a cleat plate for use with preformed outsoles with a cleat embedded therein;

FIG. 7 is a fragmentary section through an outsole with a flat cleat plate attached to its inner surface and with a cleat extending through the outsole and from the tread surface thereof;

FIG. 8 is a view corresponding to FIG. 7 with a cushion layer or insole interposed between the cleat plate and the outsole;

FIG. 9 is a fragmentary plan view of the outsole containing a plurality of holes through which the cleats extend.

FIG. 10 is a fragmentary plan view of the cushion layer containing holes through which the cleats extend;

FIG. 11 is a transverse section of a mold assembly by means of which a cleat plate such as illustrated in FIGS. 1 to 8 is formed and cleats attached thereto;

FIG. 11a is an enlarged fragmentary section of the cleat plate mold shown in FIG. 11, with the upper end of the hole provided with a right section;

FIG. 11b is an enlarged fragmentary section of the cleat plate shown in FIG. 11, with the upper end of the hole provided with a beveled section;

FIG. 12 is a fragmentary section of a cleat plate for use with molded bottoms with a cleat embedded therein;

FIG. 12a is a fragmentary section of a cleat plate mold used in making the cleat plate shown in FIG. 12;

FIG. 13 is a fragmentary section of a sole plate mold used in incorporating a cleat plate such as shown in FIG. 12 into the bottom of a shoe by molding;

FIG. 13a is a fragmentary vertical section showing a cleat plate of the kind shown in FIG. 12 incorporated in a molded bottom independently of the lasted upper, with both the cleat plate and the bosses buried in the bottom member;

FIG. 13b is a section like FIG. 13a showing the cleat plate combined with the molded bottom member with only the conical bosses embedded in the bottom member;

FIG. 14 is a fragmentary section of a bottom member which constitutes both a cleat plate and a sole with a cleat formed therein;

FIG. 15 is a fragmentary section of a bottom-forming mold for forming a bottom such as shown in FIG. 14 to the bottom of a lasted upper;

FIG. 16 is a fragmentary section of a bottomforming mold for forming the bottom member such as shown in FIG. 14 independently of a lasted upper;

FIG. 17 is a fragmentary detail of a typical bottom mold; and

FIG. 18 is a fragmentary plan of a spacer grid.

Referring to the drawings (FIGS. 1 and 2), there is shown a cleat plate 10 and cleats 12 attached to one side of the cleat plate, there being seven such cleats, one at the tip and the remaining distributing along the opposite sides of the cleat plate.

The cleat plate 10 corresponds substantially in configuration to the part of the bottom of the shoe in which it is to be incorporated, is relatively thin, flexible enough to withstand repeated bending without cracking, tough enough to resist tearing of the cleats therefrom and light enough to add substantially little weight to the shoe in which it is to be incorporated. A moldable material is preferred such as natural or synthetic rubber and compounds thereof, or man-made plastics such as PVC. It is to be understood, however, that other materials embodying the characteristics referred to whether metallic or non-metallic may be used.

The cleat plate 10 as shown in FIGS. 1 and 2 is uniformly thick; however, it may be provided on its upper side with a marginal groove 10a, such as shown in FIG. 1a, along the sides and around the end and a bevel 10b at the butt end as shown in FIG. 1b. Additionally, if desired, the cleat plate may have one or more holes through it (not shown) to provide for better anchorage within a molded bottom as will appear hereinafter.

Each cleat as shown in FIG. 5 comprises a flat head 14, a first cylindrical portion 16 of smaller diameter stemming from the head, a second cylindrical portion 18 of smaller diameter than the first cylindrical portion extending from the first cylindrical portion and a tapered portion 20 terminating in a tip 22 adapted to receive a hardened wear-resistant insert 24. A conical or beveled shoulder 26 is provided at the junction of the first and second cylindrical portions 16 and 18 and a conical or beveled portion 28 is provided at the junction of the second cylindrical portion 18 and the tapered portion 20. The tip 22 of the tapered portion is drilled axially and the insert 24 is pressed and/or brazed or welded into it. The head 14 is preferably non-circular and contains symmetrically disposed circular depressions 30. Optionally, holes may be formed through the head where the depressions are or the peripheral edge of the head may contain notches of suitable configuration.

For the average golf shoe, cleats having the following dimensions are found to be very satisfactory. It is to be understood, however, that the cleat dimensions may be increased or decreased for heavier or lighter weight shoes without departing from the intent and purpose of the invention.

| Dimensions of Cleat | | |
|---|---|---|
| | Length | Diameter |
| Head | .062 | .500 |
| First cylindrical portion | .218 | .298–308 |
| First conical portion | .177 | 45° |
| Second cylindrical portion | .031 | .254–259 |
| Second conical portion | .031 | 45° |
| Tapered portion | .250 | .186–195 (larger diameter) |
| | | .130–134 (smaller diameter) |
| Insert | .047 | .088–090 (tungsten) |

The cleats 12 are attached to the cleat plate 10 by embedding them in integrally formed bosses 32 at one side of the cleat plate so that they extend perpendicularly from the one side. As illustrated in FIG. 6, each boss 32 comprises a relatively large diameter circular portion 34 next to the cleat plates and a smaller diameter portion 36 of circular cross-section terminating in an end face 38. The head 14, first and second cylindrical portions 16 and 18, first conical shoulder 26 and a portion of the second conical shoulder 28 of the cleat are buried in the boss 32. The remainder of the conical shoulder 28 and the tapered portion 20 extend from the end face 38 of the boss.

The cleat is formed of a suitable metal made by die pressing, in a screw cutting machine or by molding of powdered metal to the configuration disclosed in FIG. 5 and the insert is preferably tungsten. It is to be understood, however, that the cleats may be comprised of other suitable metal which will resist rusting, provide suitable resistance to impact and bending, and will be light in weight. The tungsten insert may be replaced by any other material which will provide corresponding characteristics.

The cleat plate and cleats thus far described are especially designed for use with performed outsoles and may be combined with a preformed leather outsole 40, as shown in FIGS. 7 and 9, by providing holes 42 of two diameters in the outsole for receiving the bosses 32, in which the cleats are embedded. An adhesive 44 is applied to the surface of the cleat plate and the inner surface of the outsole to secure the cleat plate to the outsole and preferably the holes 42 are made slightly smaller in diameter than the bosses 32 so that when the cleat plate is assembled with the outsole the bosses must be forced through the holes 42. Adhesive is also applied to the inner surface of the holes 42 and the outer surfaces of the bosses 32 and as illustrated the axial length of the bosses correspond substantially to the thickness of the outsole so that all that extends from the tread surface of the outsole are the lower portions of the conical shoulders 28 and the tapered portions 20 of the cleats. The outsole with the cleat plate attached thereto with the cleats extending through its tread surface, as shown in FIG. 7, can be attached to the bottom of the lasted shoe by stitching, stapling or adhesive.

Optionally, a cushion layer or insole 46, as shown in FIGS. 8 and 10, may be interposed between the cleat plate and the outsole to provide for greater foot comfort. The cushion layer or midsole is provided with holes 48 through which the bosses 32 are adapted to extend and the cleat plate and the outsole are attached to the opposite sides of the cushion layer or outsole 46 by means of adhesive 50 applied to the surfaces. The composite bottom thus constructed may be applied to the bottom of a lasted upper by sewing, stapling and cementing as previously mentioned. Instead of leather the outsole may be a premolded elastomer or other suitable bottom-forming composition.

In an earlier filed application, the cleat plate 10 was comprised of a material which could be rendered soft at an elevated temperature so as to enable conforming it intimately with the bottom of a lasted upper particularly if the bottom as in most instances is somewhat convex. In others of the pending applications, the cleat plate was comprised of a material which was sufficiently flexible so that it could be conformed to the convex lower surface of the lasted upper without pre-softening it. In this application cleat plates of either of the foregoing kind may be employed, that is, a cleat plate which may be presoftened to enable conforming it to the bottom or a cleat plate which is flexible enough to be conformed by pressure to the bottom. Additionally, it is within the scope of this invention to preform the cleat plate, that is, to give it a curvature longitudinally and transversely which will approximate the curvature of the bottom of the lasted upper. As illustrated (FIGS. 2 and 3), the longitudinal and transverse curvature is the mean between a perfectly flat bottom and a bottom of maximum curvature. The curvature may be achieved by subjecting the cleat plate to heat and pressure within a suitable forming mold.

FIG. 12 shows a fragmentary portion of a cleat plate provided with an integrally formed boss 32a of conical configuration designed especially for incorporation by molding into a bottom formed independently of a lasted upper or directly applied during its formation to the lasted upper. As shown in FIG. 12, the first cylindrical portion 16 and the first beveled shoulder 26 of the cleats are buried in the conical boss. The second cylindrical portion 18, the second conical shoulder 28 and the tapered portion 20 of the cleat extend from the end of the boss.

A mold assembly for making cleat plates of the kind shown in FIGS. 1 to 6 inclusive, is shown in FIG. 11, comprising a ring 52 open at the top and bottom, a cleat plate mold 54 supported at the bottom for movement through the bottom opening toward the top and a cover plate 56. The ring 52 corresponds in configuration to the cleat plate to be formed. The cleat plate mold contains a plurality of holes 58 corresponding in number to the number of cleats to be employed. The upper end of each hole is smaller in diameter than the diameter of the conical shoulder 28 and larger than the smaller diameter thereof so that the cleats rest in the plate with the beveled shoulder engaged with the rim of the hole as shown in FIG. 11a. Above the upper end of the hole 58 there is a cylindrical hole 61 corresponding in diameter to the portion 36 of the boss 32 and a cylindrical hole 63 corresponding in diameter to the cylindrical portion 34 of the boss.

The upper end of the hole 58 is made slightly smaller than the larger diameter of the conical shoulder 28 of the cleat so that an appreciable amount of the conical shoulder 28 will set up above the upper end of the hole. This provides for flow of the bottom-forming composition around the shoulder at the junction of the cylindrical portion 18 and the conical shoulder 28 onto the surface of the latter to provide a seal.

Optionally, as shown in FIG. 11b, the upper end of the hole may be provided with a conical depression 60, the upper diameter of which is made smaller than the upper diameter of the conical shoulder 28 and the lower diameter of which is larger than the lower diameter of the conical shoulder 28 so that the shoulder of the cleat sets up in the hole with its upper portion above the upper end of the conical depression. This provides as before for flow of the bottom-forming composition around the corner from the cylindrical portion onto the surface of the conical shoulder to form a seal. Additionally, the provision of a conical recess or depression 60 provides a tolerance which compensates for minor deviations in the dimensions of the cleats and the dimensions of the cleat plate mold.

As illustrated in FIG. 11, the top surface 62 of the cleat plate mold and the bottom surface 64 of the cover plate are flat to provide the cleat plate with flat surfaces, as shown in FIGS. 1 and 2. It is within the scope of the invention to make the upper surface of the cleat plate mole and the lower surface of the cover plate curved to provide a cleat plate with the curved upper and lower surfaces as shown in FIGS. 3 and 4.

A cleat plate with cleats attached thereto is made with the foregoing mold assembly by dropping a cleat in each of the holes 58 in the cleat plate mold and then introducing the elastomer into the mold cavity 66 above the cleat plate mold, placing the cover plate 56 over the open top and then causing the elastomer to conform to the configuration of the cavity and to the portions of the cleats situated above the cleat plate mold within the cavity. If natural or synthetic rubber or rubber compounds are employed, a biscuit of the material is placed in the cavity 66 and then the cleat plate mold 54 is raised to apply pressure and heat to cause the rubber or rubber compound to flow throughout the cavity and about the portions of the cleat within the cavity to conform to the configuration of the cavity. Heat is applied by supplying heat to the mold parts in suitable fashion, for example, by resistance coils set into the cleat plate mold and side ring or by steam coils in the mold parts. To hold the cleats firmly in place during the molding operation the cover plate 56 may be provided with slender, downwardly projecting spacer pins 56a preferably yieldably mounted and sufficiently slender as to be readily withdrawn from the molded cleat plate following the molding operation. Alternatively, the holes for receiving the cleats may be magnetized inserts set into the cleat plate mold which will hold the cleats firmly in place.

For making cleat plates of the kind shown in FIG. 12 designed especially for incorporation into a bottom by molding, a mold assembly is provided such as shown in FIG. 12a comprising a ring 52', a cleat plate mold 54' and a cover plate 56'. The cleat plate mold 54' contains holes 58', the upper ends of which are smaller in diameter than the larger diameter of the conical shoulders 26 of the cleats and larger than the smaller diameters. Optionally, the upper ends of the holes may be provided with a beveled recess as shown in FIG. 11b. When provided with a beveled recess the larger diameter of the beveled recess is made smaller than the larger diameter of the beveled shoulder 26 so as to support the cleat in the hole 58' with the cylindrical portion 16 above the upper end of the hole and the cylindrical portion 18, beveled shoulder 28 and conical portion 20 within the hole. Above the upper end of the hole 58' there is a conical opening 60' of a configuration to form the conical boss 32a. The cleat plate may be made by compression or injection molding processes and in the process of its manufacture may be completely cured or vulcanized or may be particially cured or vulcanized, the latter condition under certain circumstances being more desirable from the standpoint of obtaining a permanent bond between the cleat plate and the bottom-forming composition molded about it in making a molded show bottom.

The cleat plate shown in FIG. 12 and as made with the mold assembly shown in FIG. 12a may be incorporated in a bottom and simultaneously attached to a lasted upper by a mold assembly such as shown in FIG. 13, or may be incorporated in a unit bottom independently of the upper as shown in FIGS. 13a and 13b by replacing the lasted upper at the open top of the mold assembly with a cover plate. The mold assembly for incorporating the cleat plate and cleats in an elastomeric bottom, shown in FIG. 13, comprises a ring 80 open at the bottom and top, a sole plate mold 82 supported at the bottom for movement through the bottom opening toward the top, the ring and sole plate in combination providing a cavity 84. If a sole is to be formed directly to the lower side of a lasted upper, the upper U is supported at the open top of the ring 80, preferably in engagement with a beveled lip 86 around the open top. The sole plate mold 82, as shown, contains a plurality of cylindrical holes 88. The upper end of each hole is made slightly smaller in diameter than the diameter of the conical shoulder 28 of the cleat so that when the cleat plate is mounted in the cavity 84 with the cleats engaged with the holes 88, the conical shoulders 28 seat in the upper ends of the holes with the upper portions thereof slightly above the upper ends of the holes thus allowing the bottom-forming composition to flow around the corners between the cylindrical portions 18 and the conical shoulders onto the surfaces thereof to form a seal where the latter protrude from the tread surface of the sole. Optionally the upper ends of the holes 88 may be provided with beveled recesses such as shown in FIG. 11b and as thus provided the larger diameters of the beveled recesses are made smaller than the larger diameters of the conical shoulders 28 to enable forming a seal on the surface of the shoulders 28 where they protrude from the tread surface.

The cleat plate is attached by mounting it in the mold cavity with the cleats engaged with the upper ends of the holes 88, in which position the upper portions of the conical shoulders 28, the cylindrical portions 18, the conical bosses 32a and the cleat plate 10a are all situated above the upper ends of the hole 88, while the lower portion of the conical shoulders 28 and the tapered portions 20 are situated within the holes 88.

As thus positioned a bottom-forming composition is deposited in the cavity 84 and is caused to conform to the configuration of the cavity and to the cleat plate and portions of the cleats situated within the cavity. If natural or synthetic rubbers or compounds are employed, a biscuit of the material is placed in the mold cavity whereupon heat and pressure are applied by raising a suitably heated sole plate mold upward toward the lasted upper supported at the top of the ring to cause the composition to flow throughout the cavity and about the cleat plate and cleats. If man-made materials are employed, such as PVC, the plasticized material is injected through a suitable opening in the sole plate mold or side ring. In either case, whether by compression molding or injection molding, the cleat plate may be held spaced from the lower surface of the lasted upper, for example, by a spacer member or bottom filler piece 89 which may contain holes or may be in the form of a grid or lattice to permit the material to flow through it to form a good bond with the bottom of the lasted upper, or the sole plate mold may be raised to force the cleat plate against the bottom of the lasted upper and in this latter instance it is desirable to use a cleat plate with a groove in its upper surface and a bevel at its butt end as shown in FIGS. 1a and 1b. Additionally, in order to obtain a good bond it may be desirable to have holes through the cleat plate so that some of the elastomer may flow through into engagement with the lower surface of the lasted upper.

The spacer 89 may be adhesively attached to the upper surface of the cleat plate, for example, by means of adhesive, or it may be attached to the lower surface of the lasted upper. In lieu of such a spacer, spacing pins may be fixed to the upper surface of the cleat plate for contact with the lower surface of the lasted upper to hold the cleat plate in position during the molding operation. The spacer and the pin may be comprised of a metal which will become integrated with the bottom-forming composition during the molding operation.

The bottom surface of the lasted upper and the surface of the cleat plate may be preconditioned by cleaning, degreasing, brushing, roughing and the like and by an application of adhesive. Optionally, as suggested above, the cleat plate may be only partially cured or partially vulcanized and completion of its curing and vulcanizing completed during the formation of the bottom, which seems to produce greater integration between the cleat plate and the bottom material.

A unit bottom which may be subsequently attached to a lasted upper may be made in the mold assembly shown in FIG. 13 by the simple expedient of substituting for the lasted upper at the open top of the mold a cover plate. By providing the cover plate with a flat lower surface the cleat plate may be incorporated in the bottom, as shown in FIG. 13a, with the cleat plate itself buried in the bottom and with its upper surface flush with the upper surface at the bottom. By providing the cover with an upwardly extending recess corresponding to the thickness of the cleat plate, the latter may be combined with the bottom as shown in FIG. 13b.

As related above, the cleats are first attached to a plate to form a cleat plate and then incorporated in a shoe bottom. If a natural or synthetic rubber or rubber compound is used as the elastomer, the cleat plate may in fact comprise essentially the bottom of the shoe, so that it is not necessary to first form a cleat plate with cleats attached thereto and then incorporate it in the bottom but rather in one operation forming what in effect is both the cleat plate and the bottom with the cleats anchored therein. This can be achieved when natural or synthetic rubber or rubber compounds are used or equivalent plastisol, because the material is stiff enough and tough to firmly hold the cleats without an independent cleat plate. FIG. 15 shows a mold assembly for attaching cleats directly to the bottom of a lasted upper without first attaching them to a cleat plate. The mold assembly comprises a ring 100 open at the top and bottom, a sole plate mold 102 containing holes 104 supported at the open bottom of the ring for movement therein relative to the top. The upper ends of the holes 104 are made of right section or may be beveled as indicated in FIGS. 11a and 11b. To form the bottom and attach the cleats a plurality of cleats are dropped in the holes 104 so that the conical shoulders 28 seat on the upper ends of the holes with the cylindrical portions 18, conical shoulders 26, cylindrical portions 16 and heads 14 situated within the mold cavity and with the tapered portions 20 situated in the holes. To achieve this the diameters of the upper ends of the holes 104 whether of right section or beveled are made smaller than the larger diameters of the conical shoulders 28.

A biscuit of rubber or rubber compound is deposited in the cavity above the sole plate mold and either a flat cover plate or lasted shoe upper is held against the open top whereupon pressure and heat is applied by raising the sole plate in the ring. When a cover plate is employed a composite sole is formed with the cleats attached thereto. The sole as thus formed may be attached in a conventional manner to the bottom of a lasted upper. When a lasted upper is held against the open top of the mold, the sole together with the cleats are directly attached to the bottom of the lasted upper.

In the absence of the cleat plate for holding the cleats during the molding operation a spacer grid or latice 106 (FIG. 18) is placed between the upper surfaces of the heads and the lower surface of the lasted upper through which the bottomforming composition may flow freely to form an integrated structure. Preferably the grid is comprised of an elastomer which will integrate with the bottom during molding.

When making a unit sole in which the lasted upper is replaced by a cover plate, fixed of yieldable pins 56a may be fixed to the underside of the cover plate to engage the upper surfaces of the heads to hold them in place. If such pins are slender they may be easily withdrawn from the completed bottom after the molding operation. In place of the spacer grid or the spacer pin, the sole plate mold may be provided with inserts containing the holes 104 which are magnetic to hold the cleats firmly in place.

FIG. 14 shows a cleat embedded in a bottom which, according to the preceding method of making, comprises the cleat plate and the bottom. As thus constructed, the head 14, cylindrical portion 16, conical shoulder 26, cylindrical portion 18 and the upper portion of the conical shoulder 28 are all embedded in the bottom. The lower part of the conical shoulder 28 and the tapered portion 20 protrude from the tread surface.

Because of the fact that the cleats are comprised of hard metal, the upper ends of the holes in the bottom plate mold of the mold assembly would soon wear out of round and become enlarged; hence it is desirable to provide a hard wearing metal where the holes extend through the bottom plate. This is achieved by providing large openings 94 in the sole plate mold as is illustrated in FIG. 13 and pressing cylindrical inserts 96 into the openings, the inserts being comprised of tool steel and contain the upper portions 88a of the holes 88. For convenience, the sole plate mold is made in two parts, to wit, a part 82a containing the inserts 96 and a part 82b containing the lower part 88b of the holes 88,--the two parts being bolted to each other. When an insert becomes warn by long use in spite of the fact that it is comprised of tool steel, the parts 82a and 82b are separated and the inserts are driven out of the parts 82a and replaced with new inserts. Optionally, the sole plate mold may be made of one piece (FIG. 17) with the hole 88b larger than the hole 88a so that the insert can be easily pushed out when it is necessary to replace it. While the provision of the inserts are described only with respect to FIG. 13, each of the mold assemblies shown is provided with corresponding tool steel inserts and these inserts provide convenient means for magnetically holding the cleats in place since the inserts may be magnetized prior to insertion into the plate.

It is also to be observed in conjunction with the insert 96 shown in FIG. 13, that a shallow conical depression 60a is provided around the upper end of the hole within which the cleat rests, being formed in the upper end of the insert. Similar shallow conical recesses are provided in each of the bottom plates of the mold assemblies around the holes within which the cleats are deposited and the surfaces of these shallow recesses are polished so as to form smooth conical mounds on the tread surface of the sole.

In describing the invention in its various aspects, it has been pointed out that natural and synthetic rubber and rubber compounds and man-made plastics such as PVC may be employed for making both the cleat plate and the bottom of the shoe in which the cleat plate with the cleats attached is incorporated. The following rubbers and plastics have been employed:

Rubber
1. Natural or (crude rubber)
2. Hycar - a copolymer of a butadiene and acrylonitrile Plastic
1. PVC
2. Polyurethanes
3. Polypropylenes Although the cleats have been described as being made of metal it is within the scope of the invention to make them of an elastomer as described in pending U.S. application Ser. No. 710,973 now U.S. Pat. No. 3,432,181, and also to make them of materials other than metal and elastomers, for example, argillaceous material and carbides which may be vitrified or sintered. It is also within the scope of the invention to mix with the elastomer materials which will undergo expansion through the elapse of time during the molding operation or by the application of heat during the molding operation so that by controlling the position of the sole plate portions of the bottom may be dense and other portions porous, for example, to form a dense layer about the heads of the cleats and a porous layer outwardly thereof. The dense layer would thus provide good anchorage for the cleats and the porous layer a lighter and more cushion-like surface to walk upon.

In the description as thus far related, the cleat plate is shown as having a configuration of the forepart of the shoe; however, it is to be understood that cleat plates corresponding in configuration to the heel of the shoe may be made in the same fashion and incorporated in the heel structure of a shoe in the same manner as described above with respect to incorporation of the cleat plate in the forepart of a shoe.

We claim:

1. The method of making a cleated bottom comprising providing cleats with heads of relatively large diameter from which stem shanks having first cylindrical portions next to the heads, second cylindrical portions of smaller diameter extending from the first cylindrical portions, tapered portions extending from the second cylindrical portions, and first conical shoulders at the junctions of the first and second cylindrical portions and second conical shoulders at the junctions of the second cylindrical portions and the tapered portions, supporting the cleats by means of the first conical shoulders within holes in the bottom of an open top mold containing a cavity of smaller area and depth than the bottom to be formed, forming a cleat plate of an elastomer about the portions of the cleats above said first shoulders within said mold cavity, removing the cleat plate from the mold cavity with the cleats attached thereto, supporting the cleat plate and the cleats attached thereto by means of the second conical shoulders within holes in the bottom of an open top mold containing a cavity corresponding in area and depth to the bottom to be formed, and forming a bottom of elastomer about the cleat plate and the cleats situated within the cavity above the bottom.

2. A method according to claim 1, comprising closing the open top of the mold cavity within which the cleat plate is formed by a cover plate and closing the top of the mold cavity within which the bottom is formed by a lasted upper.

3. A method according to claim 1, comprising closing the open top of each of the mold cavities with a flat cover plate.

4. The method of making a cleated bottom comprising providing a plurality of cleats, each with a head and shank said shank having at its distal end a tapered portion bored to receive a hardened tip, and intermediate said head and tapered portion axially spaced conical shoulders, the mean diameter of the conical shoulder next to the head being larger than the mean diameter of the conical shoulder farther from the head, supporting a plurality of such cleats in the bottom of an open top mold containing holes in the bottom, the upper ends of which correspond substantially in diameter to the mean diameters of the conical shoulders next to the heads, forming a cleat plate in the cavity about the portions of the cleats in the cavity above the upper ends of the holes in the bottom, removing the cleat plate with cleats attached thereto, mounting the cleat plate with the cleats attached thereto in an open top mold cavity containing holes in the bottom corresponding in diameter to the mean diameters of the conical shoulders farther from the heads, and forming a bottom about the cleat plate and the portions of the cleats situated in the cavity above the upper ends of the holes in the bottom.

5. The method of making a cleated bottom, comprising providing a plurality of cleats, each with a head and shank, said shank having a tapering end portion bored to receive a hardened tip at its terminal end and intermediate the head and tapering end axially spaced conical shoulders, the shoulder next to the head having a larger mean diameter than the shoulder farther from the head, supporting the cleats in holes in the bottom of an open top mold containing holes in the bottom corresponding in diameter to the mean diameters of the conical shoulders farther from the heads, closing the top of the mold cavity with a cover plate, mounting a grid in the cavity between the cover plate and the upper sides of the heads of the cleats to hold the cleats in said holes against displacement and forming a bottom structure of elastomer in the cavity about the portions of the cleats situated therein above the holes in the bottom.

6. A method according to claim 5, comprising closing the open top of the mold cavity with a lasted upper and interposing a grid in the cavity between the lower side of the lasted upper and the upper side of the heads of the cleats to hold the cleats in said holes against displacement.

7. A method according to claim 5, comprising employing as said spacer means a grid comprised of a material compatible with the bottom-forming composition.

8. A method according to claim 5, comprising employing as said spacer means a grid comprised of a material which will become integrated with the bottom-forming composition during formation of the latter to the configuration of the cavity and the portions of the cleats situated therein.

* * * * *